United States Defensive Publication [19] (H) [11] T973,009

Frantzreb, Sr. [43] Aug. 1, 1978

[54] APPARATUS AND METHOD FOR HEATING A CONTROLLED, MOVING WIRE CONTAINING TREATING AGENTS

[75] Inventor: John G. Frantzreb, Sr., Peoria, Ill.

[73] Assignee: Caterpillar Tractor Co., Peoria, Ill.

[21] Appl. No.: 849,730

[22] Filed: Nov. 9, 1977

[51] Int. Cl.[2] ..... B22D 27/20

[52] U.S. Cl. ..... 164/50; 164/57

[57] ABSTRACT

An electric circuit controllably heats a controlled, moving wire containing treating agents during entry of the wire into molten metal of a mold. The electric circuit includes an electrode and a power supply which has first and second terminals. The first terminal is connected to the wire at a location spaced from the mold and the second terminal is connected to the electrode. The electrode extends into the mold and forms a current path through the molten metal to the wire. The wire is controllably heated to a preselected temperature in response to current flow therethrough.

A method of heating the controlled, moving wire during entry of the wire into a mold is provided by connecting the power supply to the wire at a location outside the mold to the electrode which extends into the mold; submerging selected portions of the wire and electrode into the molten metal and forming the electric circuit; and delivering current to the wire of a magnitude sufficient for increasing the temperature of the wire to a preselected temperature.

5 Claims, 1 Sheet Drawing,

7 Pages Specification

The file of this unexamined application may be inspected and copies thereof may be purchased (849 O.G. 1221, Apr. 9, 1968).

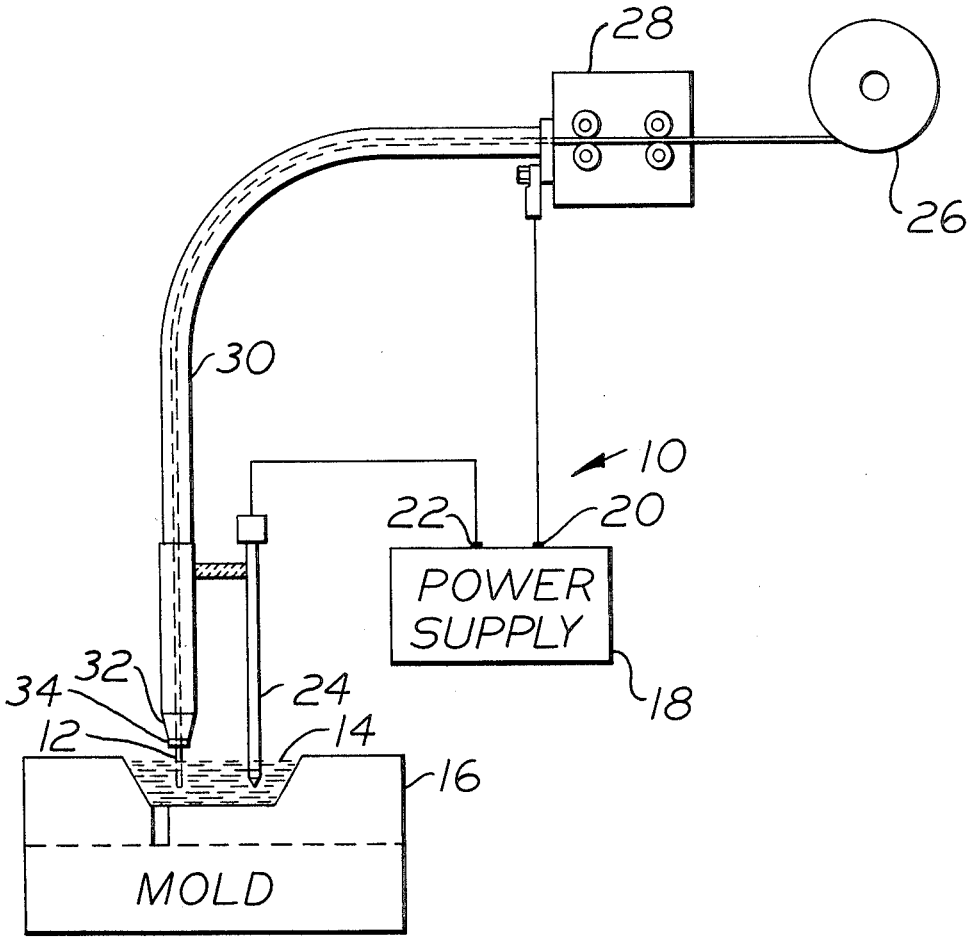

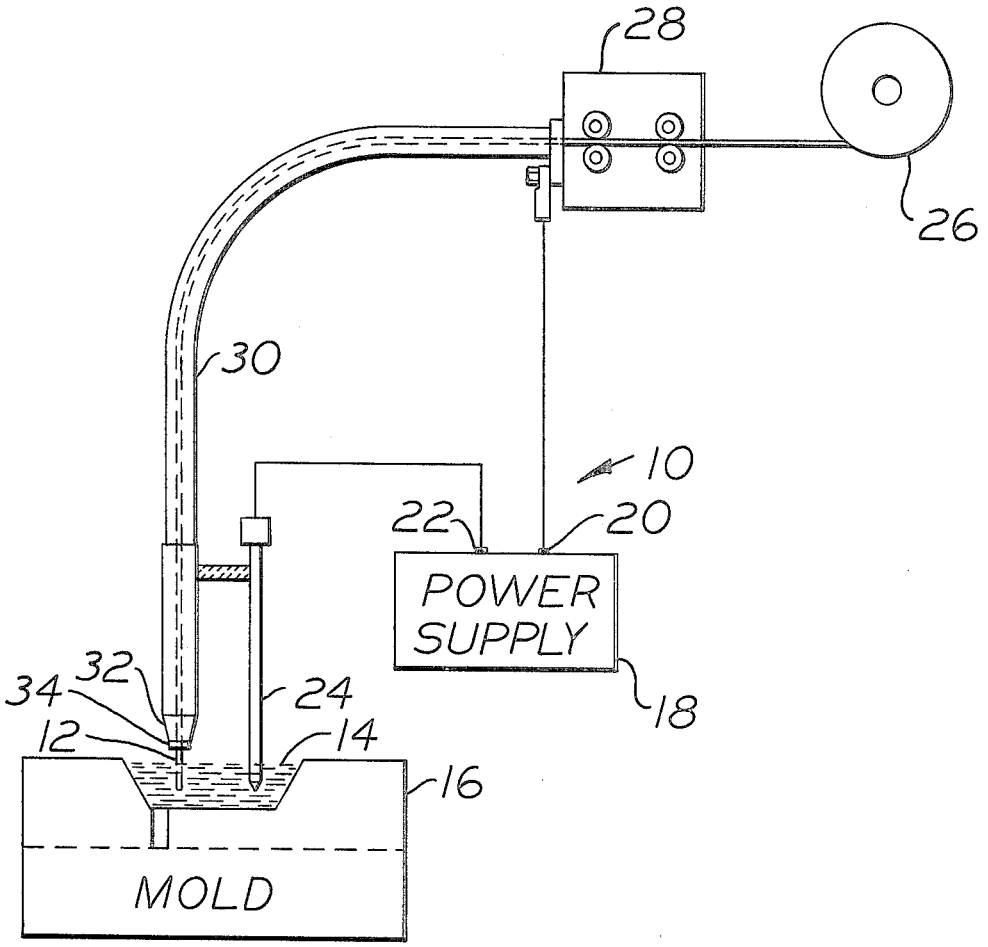
28
26
30
10
22
20
POWER
SUPPLY
18
32
34
24
12
14
16
MOLD